No. 738,304. PATENTED SEPT. 8, 1903.
C. FAUST.
HEATING STOVE.
APPLICATION FILED MAY 25, 1903.
NO MODEL. 3 SHEETS—SHEET 1.
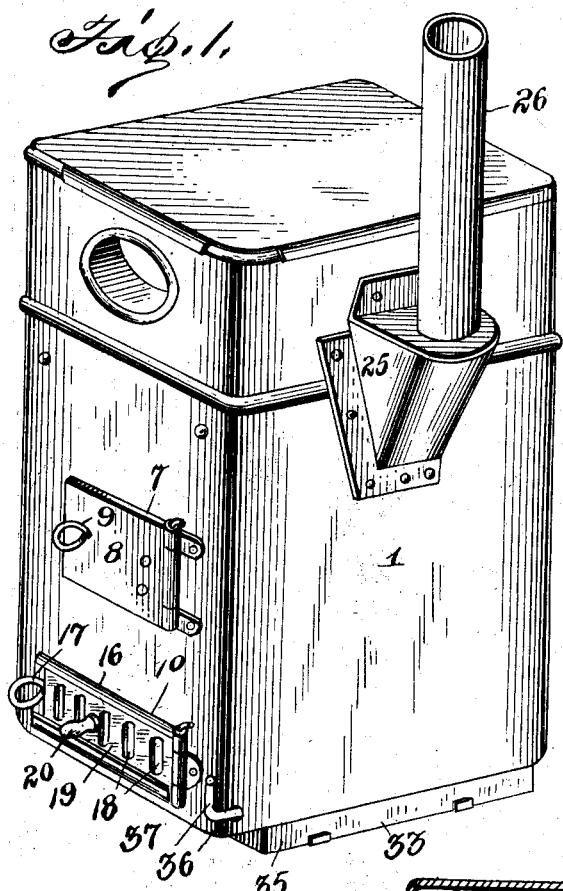
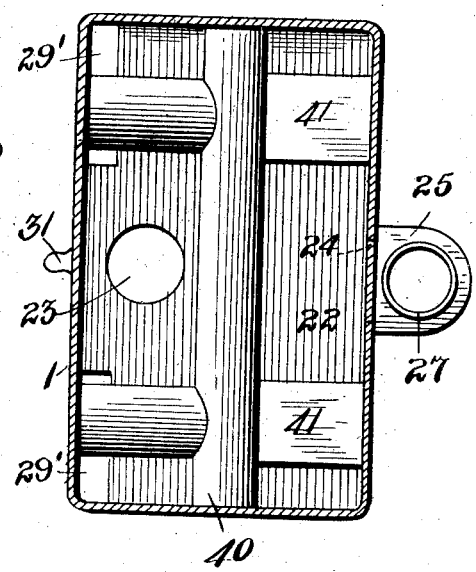
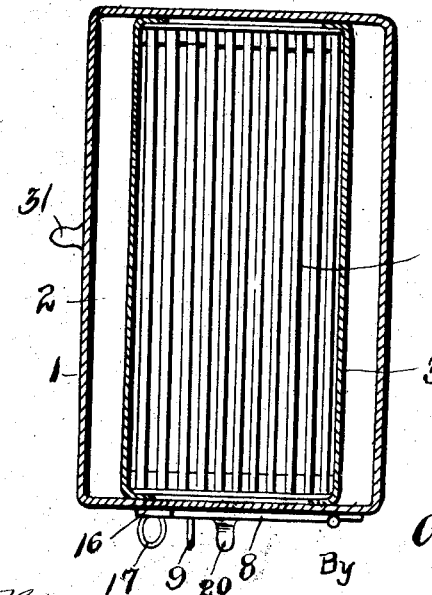
WITNESSES
INVENTOR
Casper Faust,
By
Attorney.

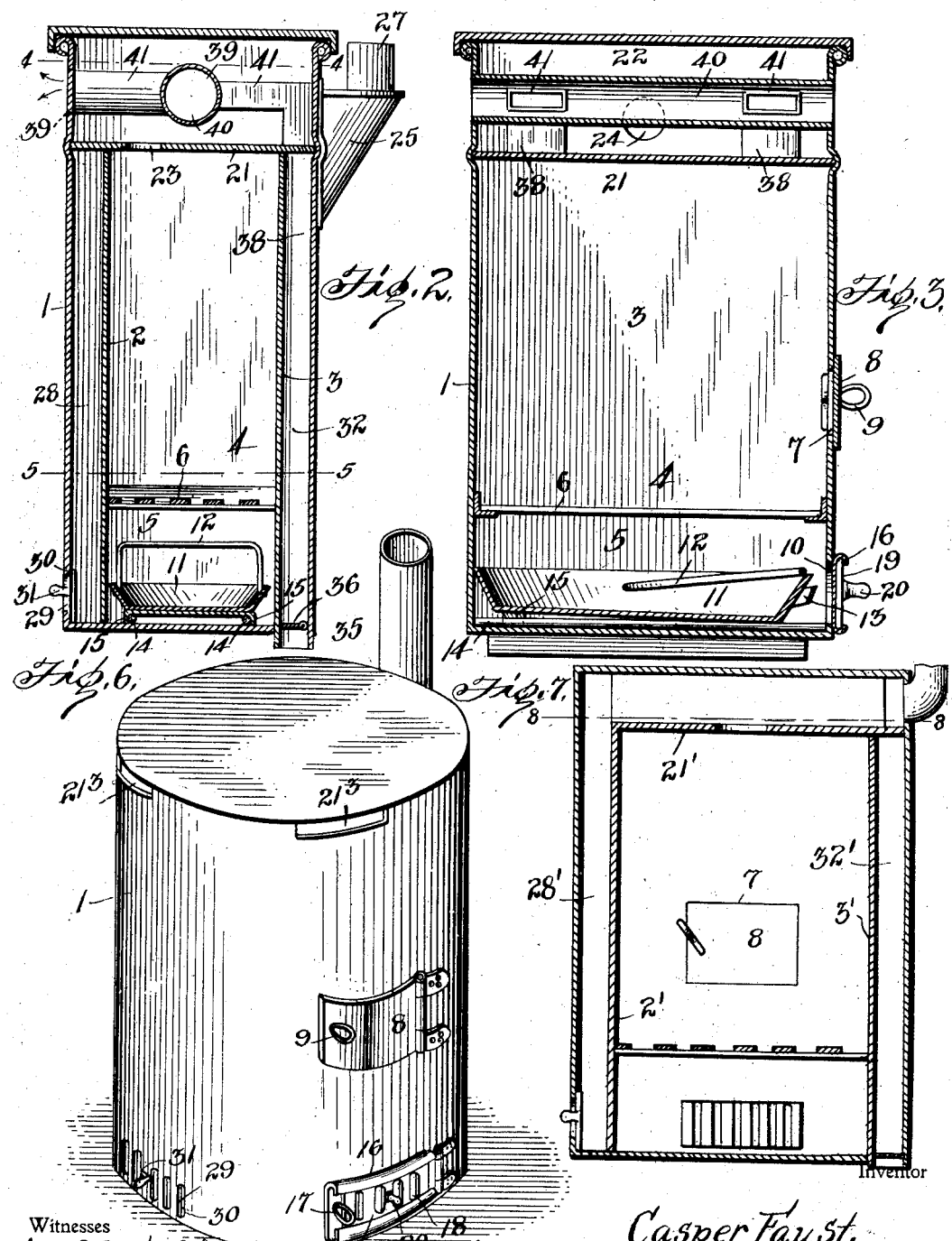

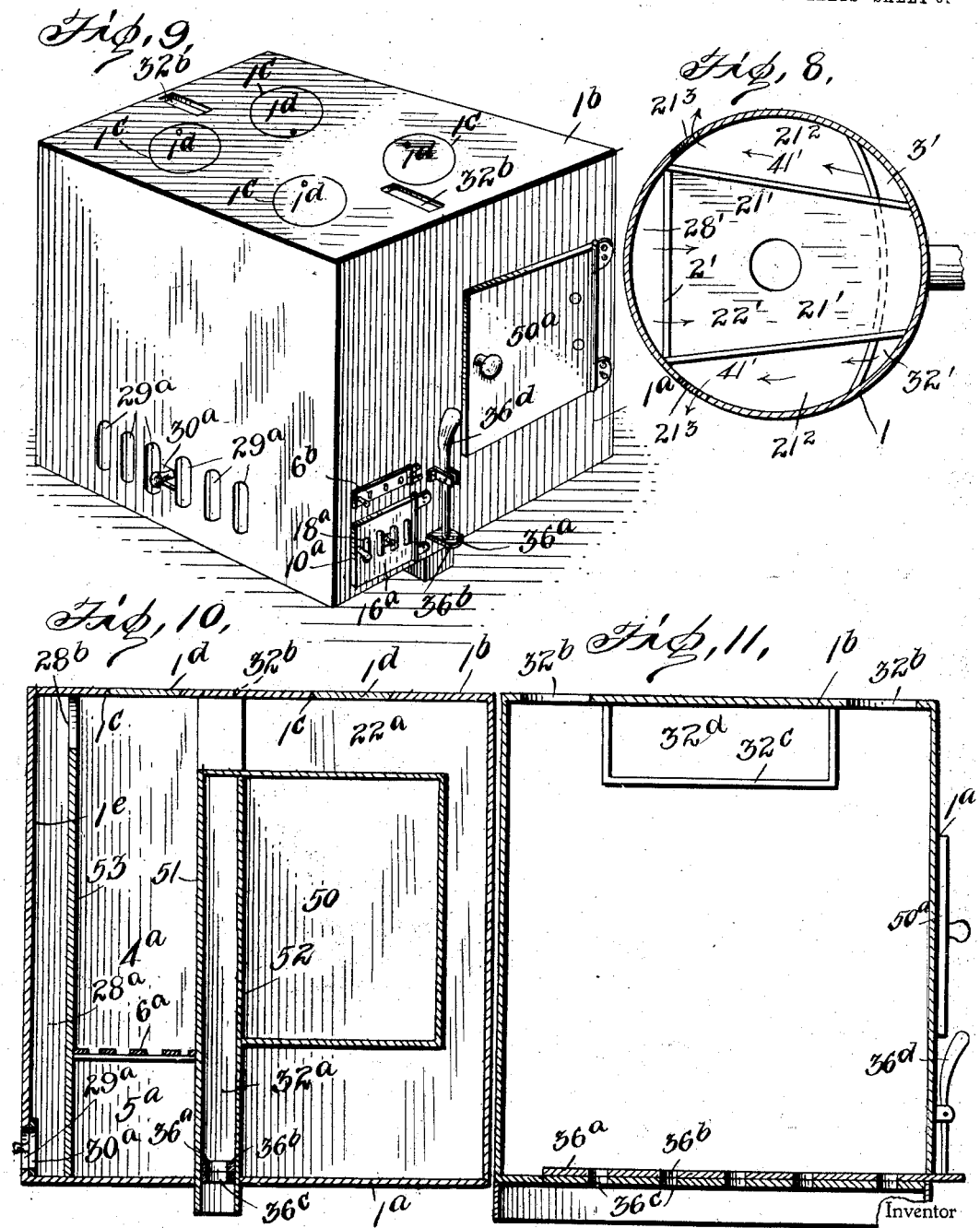

No. 738,304. Patented September 8, 1903.

UNITED STATES PATENT OFFICE.

CASPER FAUST, OF RHINELANDER, WISCONSIN.

HEATING-STOVE.

SPECIFICATION forming part of Letters Patent No. 738,304, dated September 8, 1903.

Application filed May 25, 1903. Serial No. 158,716. (No model.)

*To all whom it may concern:*

Be it known that I, CASPER FAUST, a citizen of the United States, residing at Rhinelander, in the county of Oneida and State of Wisconsin, have invented certain new and useful Improvements in Heating-Stoves; and I do declare the following to be a full, clear, and exact description of the invention, such as will enable others skilled in the art to which it appertains to make and use the same.

This invention relates to new and useful improvements in stoves.

The object of the invention is to improve and simplify the construction of heating and cooking stoves, whereby an extremely efficient stove is provided which will remove the cold and foul air from the room in which the stove is located and at the same time supply fresh and pure heated air, thus causing a constant circulation of air in the room, which will be very beneficial to the health of the occupants thereof.

With these and other objects in view the invention consists of certain novel features of construction, combination, and arrangement of parts, as will be more fully described, and particularly pointed out in the appended claims.

In the drawings, Figure 1 is a perspective view of a stove embodying my invention. Fig. 2 is a vertical front to rear sectional view of the same. Fig. 3 is a vertical longitudinal sectional view. Fig. 4 is a horizontal sectional view taken on the line 4 4 of Fig. 2. Fig. 5 is a horizontal sectional view taken on the line 5 5 of Fig. 2. Fig. 6 is a perspective view of a modified form of heating-stove. Fig. 7 is a vertical front to rear sectional view through the same. Fig. 8 is a horizontal sectional view taken on the line 8 8 of Fig. 7. Fig. 9 is a perspective view of a cooking-stove, showing the application of my invention thereto. Fig. 10 is a vertical longitudinal sectional view through the same. Fig. 11 is a front to rear sectional view through the cooking-stove.

Referring to Figs. 1 to 5 of the drawings, in which I have illustrated a stove adapted more particularly for heating purposes, the numeral 1 denotes the outer casing or body of the stove, which may be of any desired form, shape, or design, but which is preferably rectangular in cross-section, as illustrated. The interior of this casing is divided by the front and rear vertically and longitudinally extending partitions 2 and 3, between which the fire-box 4 and the ash-box 5 are located, as seen in Fig. 2. The grate 6, which separates the fire and ash boxes, may be of desired construction for burning either wood or coal. In one end of the stove an opening 7 is provided, through which the fuel to be burned is passed and deposited in the fire-box upon the grate 6. This opening 7 is closed by a hinged door 8, which is adapted to be fastened by a suitable latch or catch 9. In the same end of the stove is another opening 10, which communicates with the ash-box 5 and through which a suitable ash pan or receptacle 11 may be inserted or removed. This pan 11 is provided with a carrying-bail 12, pivoted at the center of its sides, and with a fixed handle 13 at one end. The pan is adapted to be supported by and to slide upon the rails or tracks 14, secured to the base or bottom of the casing, and the bottom of the pan is provided with the guide-lugs 15, which hold the pan upon the tracks. The opening 10 in the ash-box is closed by the hinged door 16, which is provided with a suitable catch 17 to fasten the same. This door is also provided with the usual draft-openings 18, which are adapted to be closed by the slide 19, provided with an operating knob or handle 20. The top or upper end of the fire-box 4 is closed by a horizontal partition 21, which forms between itself and the top or cover of the stove a smoke box or chamber 22. An opening 23 in said partition affords communication between said boxes to permit the smoke and products of combustion to pass from the fire-box into the smoke-box. In the rear or back of the stove is an opening 24 to afford communication between the smoke-box and a discharge-elbow 25, which is secured to the back of the stove upon the outside thereof. The usual smoke-pipe 26 is attached to the collar 27 upon this elbow 25 to convey the smoke to the chimney or stack. The front partition 2, which is disposed vertically and which extends from one end of the stove to the other, forms a passage 28 between itself and the front wall of the casing of the stove. The lower end of this passage communicates with the outside of the stove through the openings 29, formed in the front wall of the casing, in order to take in the foul and cold air of the room. The upper end of this passage 28 opens into the smoke-box 22, as shown at 29', in order to discharge the cold and foul air taken in through the openings 29 into the smoke-box to be burned and carried off with the smoke to the chimney or stack. The draft through the openings 29 may be regulated by means of the sliding door 30, to which the operating-handle 31 is secured. The rear partition 3 forms the passage 32 between itself and the rear wall of the casing. Through this passage pure fresh air from the outside of the room or building is to pass, to be heated in its passage, and to be then discharged into the room. The lower end of this passage communicates with a cold-air pipe or flue, which is engaged with a flange or collar 35, depending from the bottom of the stove, and which is adapted to extend through the floor and to the outside of the building or to any point where pure air can be obtained. A damper 36 is hinged in the lower portion of the passage 32 and is provided with an operating-handle 37, extending through and upon the outside of the casing. This damper is adapted to control the inlet of cold air. The upper end of the passage 32 is closed by the horizontal partition 21, but the pipes 38 afford communication between said passage and the hot-air pipes 39, which are disposed in the smoke box or chamber 22 and which discharge the pure heated air into the room. Any desired arrangement of these pipes 39 may be used. As illustrated, a longitudinally-extending horizontal pipe 40, having its ends projecting through the ends of the casing, is intersected by the transversely-extending horizontal pipes 41, the rear ends of which communicate with the vertical pipes 38, and the forward ends of which extend through the front wall of the casing.

The operation of the stove will be readily understood upon reference to Figs. 2 and 4 of the drawings. The fuel which has been placed upon the grate 6 through the openings 7 will burn, owing to the usual fire-draft through the door 16 of the ash-box, and the smoke and products of combustion will pass from the fire-box through the smoke-box and then through the pipe 26 to the chimney or smoke-stack. Any form of damper or draft-controller may be used for regulating this fire-draft. Owing to this draft, the cold and foul air of the room will be drawn into the passage 28 through the openings 29 and will then pass off with the smoke to the chimney. Pure cold air from the outside of the room will be drawn into the pipe 33 and pass up at the back of the stove through the passage 32. In its passage through this space 32 and through the pipes 38 and 39 the air will be thoroughly heated and then discharged into the room, as will be readily understood.

It will be observed that when the foul-air draft through the passage 28 is open all the smoke will be drawn from the stove even when the fire-draft is closed and no smoke can escape into the room, as is the case in an ordinary stove. When the foul-air draft is open, the fire on the grate will be permitted to burn very slowly.

In Figs. 6, 7, and 8 of the drawings I have illustrated a heating-stove very similar to the one just described. The outer casing 1 in this embodiment of my invention is cylindrical instead of rectangular. The front and rear partitions 2' and 3' form the foul and cold air passage 28' and the pure heated air passage 32'. The space between the top of the stove and the horizontal partition 21' is provided with the two vertical partitions $21^2$ in order to form the smoke-space 22' between them and the hot-air spaces 41' upon each side of the smoke-space. Each of these spaces 41' has one of its ends communicating with the pure-air passage 32' and its opposite end communicating with the outside of the stove through the apertures $21^3$, which permit the pure heated air to discharge into the room. It will be observed that in this form of stove the hot-air pipes 39, 40, and 41 are dispensed with and the partitions 21' substituted therefor.

While I have illustrated and described my invention as applied to a wood-burning stove, it will be understood that I do not limit myself to its application to this form of stove, since with slight changes it may be used upon a stove for burning coal or any other fuel.

In Figs. 9, 10, and 11 I have illustrated one way in which my invention could be embodied in a cooking-stove. In this form of my invention the outer casing or body $1^a$ may be of any desired construction, the top $1^b$ of the same having the usual pot-openings $1^c$, which are closed by the removable lids $1^d$. Within the casing the fire-box $4^a$ and ash-box $5^a$ are disposed upon one side and the oven 50 and smoke-space $22^a$ being upon the opposite side of the stove. Between the inner side wall 51 of the fire and ash boxes and the inner wall 52 of the oven and smoke-space a vertically-extending passage $32^a$ is formed which corresponds to the passage 32 (shown in Fig. 2) and which is adapted to take in fresh cold air from the outside of the room or building and discharge it into the room. To the lower end of this passage is attached a cold-air pipe which extends through the floor and to the outside of the building or any desired point. A sliding damper $36^a$ in the lower end of this passage $32^a$ is adapted to control the inlet of cold air into the stove. This damper consists of an apertured plate $36^b$, which is mounted to slide upon the apertured bottom $36^c$ of said passage and has one of its ends projecting through the front of the casing $1^a$. A centrally-pivoted lever $36^d$ upon the front of the stove has its lower end loosely connected to the outer end of said damper-plate in order to operate the same. The upper end of the passage 32ª opens upon the top 1ᵇ of the stove through the openings 32ᵇ. These openings are in the front and rear portion of the upper end of the passage, the central portion of the same being closed by the partition 32ᶜ, which forms a passage 32ᵈ to permit the smoke and products of combustion from the fire-box 4ª to pass to the smoke-space 22ª above the oven. The outer wall 53 of the fire and ash boxes is spaced from the side wall 1ᵉ of the stove-casing to form the passage 28ª, which corresponds to the foul and cold air passage 28 in the other form of my invention. This passage 28ª has its lower portion communicating with the outside of the stove through the openings 29ª and its upper portion communicating with the fire-box 4ª through the opening 28ᵇ in the upper end of the wall or partition 53. The openings 29ª are adapted to be opened or closed by the sliding damper or door 30ª in order to control the draft of cold and foul air passing from the room through said passage. The fire-box 4ª is provided with the grate 6ª and the draft-openings 6ᵇ. A door 16ª, having suitable draft-openings 18ª, is adapted to close the opening 10ª in the front end of the fire-box. The oven 50 has a suitable door 50ª, closing its front open end. The operation of this form of my invention is similar to that form previously described. The cold and foul air of the room will be drawn in through the openings 29ª into the passage 28ª, and from thence will pass into the fire-box 4ª through the opening 28ᵇ. Pure and fresh air from the outside of the building will be drawn into the passage 32ª, will be heated as it passes through the same, and will then be discharged into the room through the openings 32ᵇ. The damper 36ª permits this draft of cold air to be controlled, so that the temperature of the oven may be regulated.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. A stove comprising a suitable body or casing, partitions forming foul and pure air passages or flues upon the sides of the fire-box, a partition forming a smoke-space above the fire-box, and hot-air-discharge pipes in said smoke-space communicating with said pure-air passage, said foul-air passage being in communication with the smoke-space and with the outside of the stove, substantially as described.

2. A stove comprising a suitable body or casing, vertical partitions in said casing forming foul and pure air passages or flues, a horizontal partition forming a smoke-space in said casing, said foul-air space being in communication with the outside of the stove and with said smoke-space, hot-air-discharge pipes in said smoke-space and communicating with said pure-air passage, means for controlling the draft through the pure-air passage, and means for controlling the draft through the foul-air passage, substantially as described.

3. A stove comprising a suitable body or casing, vertical partitions in said casing forming foul and pure air passages or flues upon the sides of the fire-box, a horizontal partition in said casing forming a smoke-space above the fire-box, said foul-air passage being in communication with the outside of the stove and with said smoke-space, a draft-door for regulating said communication, hot-air-discharge pipes in said smoke-space and communicating with the pure-air passage, and a draft-door or damper in said pure-air passage for regulating the draft through the same, substantially as described.

In testimony whereof I have hereunto set my hand in presence of two subscribing witnesses.

CASPER FAUST.

Witnesses:
  CHAS. B. PETERSON,
  MATT STAPLETON.